United States Patent [19]

Taube et al.

[11] Patent Number: 4,631,580
[45] Date of Patent: Dec. 23, 1986

[54] VIDEO-STEREOSCOPIC-IMAGE-PRODUCING SYSTEM

[76] Inventors: John Taube, 3020 NW. 29th, Gainesville, Fla. 32605; Lawrence W. O'Dell, 34498 Deerwood Dr., Eugene, Oreg. 97401; Michael D. O'Dell, 19030 SW. Willow Creek Ter., Aloha, Oreg. 97006

[21] Appl. No.: 670,321

[22] Filed: Nov. 9, 1984

[51] Int. Cl.[4] .................. H04N 7/18; H04N 13/00; A61B 3/14
[52] U.S. Cl. ..................................... 358/88; 351/206
[58] Field of Search .................. 358/88, 93; 351/206, 351/210, 214, 221

[56] References Cited

U.S. PATENT DOCUMENTS

| | | | |
|---|---|---|---|
| 4,256,384 | 3/1981 | Kani | 351/206 |
| 4,395,731 | 7/1983 | Schoolman | 358/88 |
| 4,504,129 | 3/1985 | Von Iderstine | 351/206 |
| 4,523,821 | 6/1985 | Lang | 351/214 |
| 4,533,222 | 8/1985 | Ishikawa | 351/206 |

*Primary Examiner*—Howard W. Britton
*Attorney, Agent, or Firm*—Kolisch, Hartwell & Dickinson

[57] ABSTRACT

Video-stereoscopic-image-producing system and a method for using the system is taught. The system is disclosed in conjunction with medical applications, specifically, in an embodiment useful for examining eyes. The system includes a binocular viewer for producing a pair of input images of an object which may be viewed to produce a stereoscopic image of the object. Video cameras are provided to receive a pair of images so produced and for producing, in turn, video signals representative of those images. An interface is provided for optically joining the video cameras to the binocular viewer. Video digitizing and freeze-frame equipment is joined to the cameras for generating a video display of the pair of input images and a stereoscopic viewer is provided for use with the video monitor for providing stereoscopic viewing of the displayed images by an observer. A method of using the system is taught which includes the steps of producing a pair of images of an object which may be viewed stereoscopically to produce a stereoscopic image and converting the images into a video signal representative of the images, transmitting the video signal over transmission medium to a remote location, receiving the video signal at the remote location, reproducing the pair of images from the video signal in such a manner that they will form a stereoscopic image and stereoscopically viewing the images in a manner forming a stereoscopic image of the object.

2 Claims, 7 Drawing Figures

VIDEO-STEREOSCOPIC-IMAGE-PRODUCING SYSTEM

BACKGROUND AND SUMMARY OF THE INVENTION

The instant invention relates to a system and method of using the system for remotely viewing a three-dimensional object. Specifically, the system of the instant invention enables a viewer to observe, with stereoscopic vision, an object at a location remote from the object.

Remote viewing of objects is greatly facilitated by modern television equipment. There are many instances, however, when it is necessary for an observer to have a three-dimensional view of an object in order to properly analyze and examine the object. Conventional, two-dimensional, television equipment does not meet this need. Although many instances are conceivable where stereoscopic viewing of an object would be advantageous, the instant invention is disclosed in conjunction with medical applications, and specifically, in an embodiment useful for examining eyes.

There are many ophthalmic procedures which require pre- and post-operative examinations of a patient's eyes in a three-dimensional, life-like setting. Through use of the apparatus and method of the instant invention, it is necessary for the patient to make only one actual physical visit to the doctor, the pre- and post-operative examinations being conducted through use of the instant invention. This is particularly significant in the case of elderly patients who otherwise would need to make several long journeys in order to visit a physician.

It is therefore generally an object of the instant invention to provide a system for remotely stereoscopically viewing an object.

A more specific object of the instant invention is to provide a remote ophthalmic stereoscopic viewer.

An additional object is to provide a method of remotely stereoscopically viewing an object.

A further object of the invention is to provide such a viewer which is reliable and easy to operate.

A video-stereoscopic-image-producing system for viewing an object by a remote observer is taught. A specific embodiment of the system includes imaging means in the form of an ophthalmic slit lamp for producing a pair of input images of a patient's eye, which may be viewed binocularly to produce a stereoscopic image of the eye. Binocular interface means and video production means are provided which are optically joined to the slit lamp for receiving the pair of images and producing a video signal representative of those images. Video reproduction means are joined to the production means for receiving the video signal and for generating a video display of the pair of input images. Stereoscopic viewing means are disposed relative to the reproduction means for providing stereoscopic viewing of the displayed images by the observer.

A method of remotely stereoscopically viewing an object as contemplated by this invention includes the steps of producing a pair of images of such an object which may be viewed stereoscopically to produce a stereoscopic image. The images are converted into a video signal representative of the images and the video signal is transmitted over a transmission medium to a remote location. The video signal is received at the remote location and the pair of images is reproduced from the video signal in a manner at, when stereoscopically viewed, the images form a stereoscopic image and, when stereoscopically viewing the images in a manner forming a stereoscopic image of the object.

These and other objects and advantages of the instant invention will become more fully apparent as the description which follows is read in conjunction with the drawings.

DETAILED DESCRIPTION OF A PREFERRED EMBODIMENT

Figure 1:
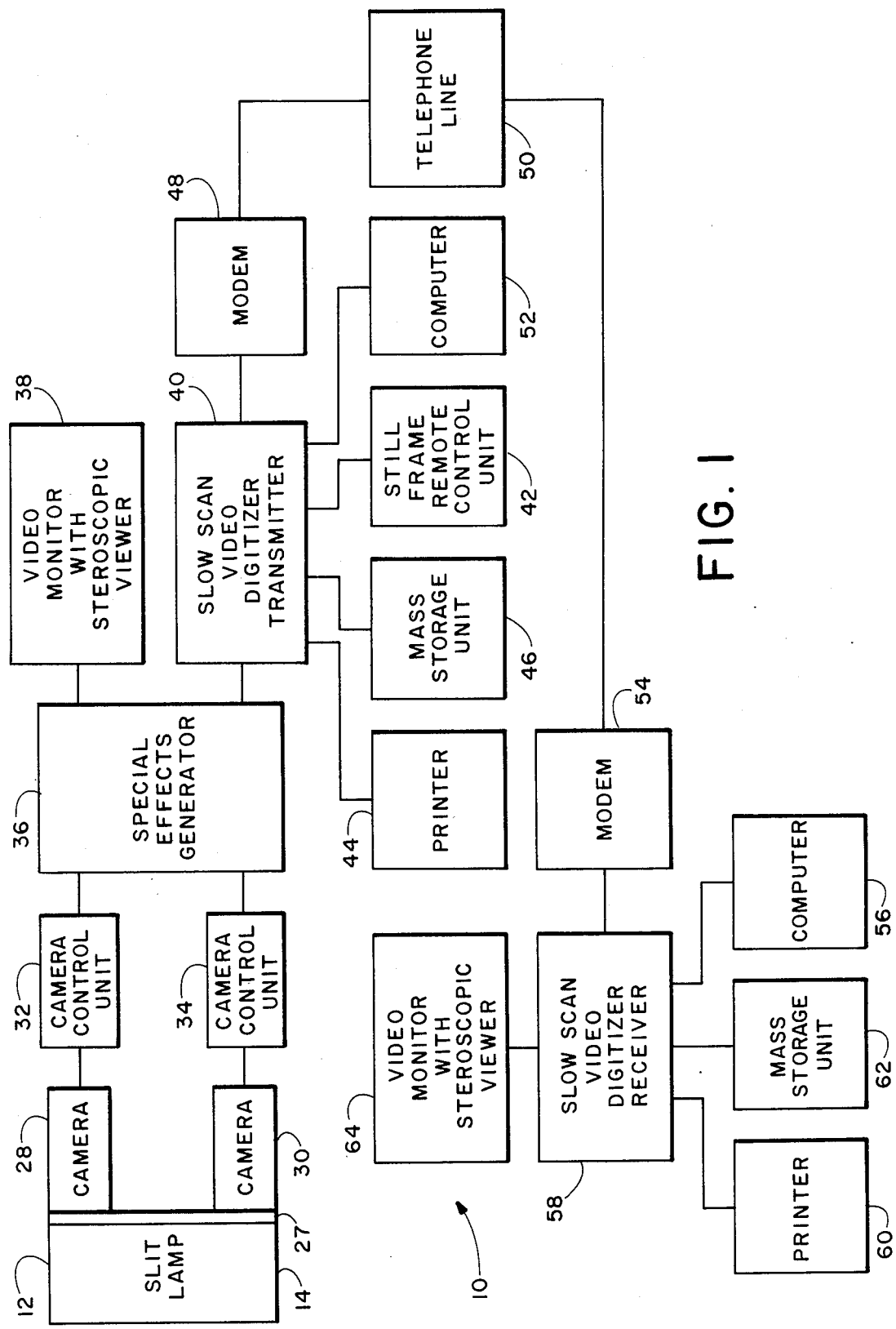
FIG. 1 is a block diagram of a video-stereoscopic-image producing system.

Turning now to the drawings, and initially to FIG. 1, a block diagram of a video-stereoscopic-image-producing system means constructed according to the invention is shown generally at 10. System 10, in the preferred embodiment, is configured to enable a physician to remotely stereoscopically view the eyes of a patient undergoing treatment. Block 12 represents an ophthalmic slit lamp, also referred to herein as imaging means or slit lamp means, having high-resolution video cameras interfaced therewith.

Figure 2:
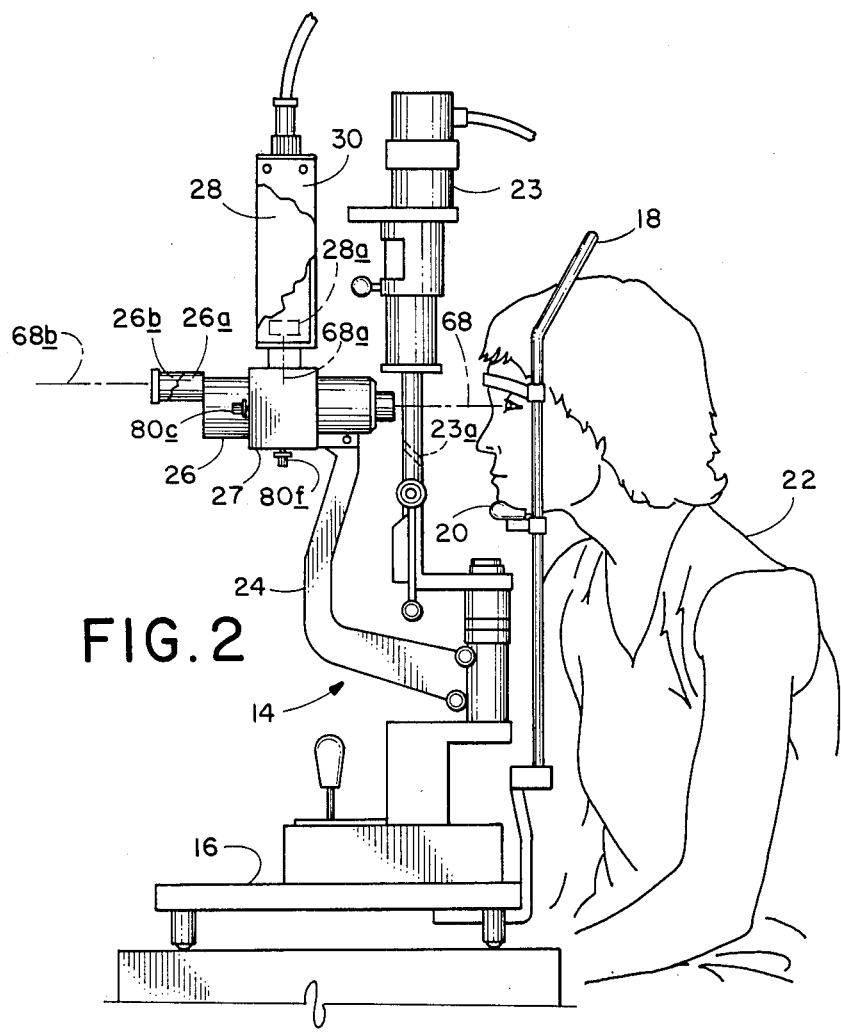
FIG. 2 is a side view of an ophthalmic slit lamp binocular adapted for use with the system of the invention, with portions broken away to show detail.

Turning momentarily to FIG. 2, the components represented by block 12 are depicted. They include a conventional ophthalmic slit lamp 14 of the type manufactured by MENTOR, Inc. Lamp 14 has a base 16, an upright 18 and a chin rest 20. A patient undergoing treatment is partially shown at 22. A light source 23 is provided to illuminate patient 22's eyes. Mirror 23a reflects light from source 23 towards the patient's eye. Slit lamp 14 includes a binocular bracket 24 and a binocular 26 carried on bracket 24. Binocular 26 provides a means for viewing, with binocular vision, an eye of patient 22. Binocular 26 enables the treating physician to view a three-dimensional image, also referred to as a pair of input images, of the eye with the aid of spaced-apart microscope elements in binocular 26 through eye pieces 26a, 26b, also referred to herein as visual observing means.

Two color video cameras 28, 30, SONY Model Number DXC 1850 in the preferred embodiment, are mounted on binocular 26 for producing color video image signals representative of the input images as seen through the eye pieces. Cameras 28, 30 are low light sensitive to provide a usable signal under normal ophthalmic viewing conditions. A binocular interface, or interface means 27 facilitates mounting of video cameras 28, 30 on slit lamp 14, and will be described in greater detail later herein.

Returning now to FIG. 1, video cameras 28 and 30 are connected to camera control units 32, 34, respectively. The cameras and their respective control units, collectively referred to herein as vidicon means are connected to a special effects generator 36. Generator 36 combines the video image signals into one combined video stereoscopic signal. A VIDEOMASTER TEL SEG 20 is used in the preferred embodiment.

Generator 36 is connected to a conventional video monitor 38 having stereoscopic viewing means (to be described later herein) mounted thereon and to a slow scan digitizer transmitter 40. Digitizer 40 is a COLORADO VIDEO Model 285T and is connected to still frame remote control unit 42, COLORADO VIDEO Model 772. Additionally, digitizer 40 may provide output to a printer 44, such as a HONEYWELL Model 4000, and/or a mass storage unit 46, such as a Colorado Video Model 930. Generator 36 and digitizer 40 comprise what is referred to herein as generator means. The generator means and vidicon means further comprise what is referred to herein as video production means.

Digitizer 40 is connected to telephone modem 48, a UNITED DATA SYSTEM 9600A-B, which transmits a signal over telephone line 50. Together, digitizer 40 and modem 40 comprise video transmitting means. Additionally, a computer 52, such as an APPLE IIc, also referred to herein as data input means, may be provided to generate object-related alpha numeric data to identify the patient undergoing treatment. Computer 52 is connected through digitizer 40 to modem 48 and adds the generated data to the video signal being transmitted over line 50.

A second modem 54 receives information transmitted over telephone lines and provides input access for a computer, or data output means, 56 and a slow scan video digitizer receiver 58. Digitizer 58, which is COLORADO VIDEO Model 285R, may be connected to a printer 60 and/or a mass storage unit 62. Digitizer 58 is also connected to video monitor 64 which has mounted thereon a stereoscopic viewing means. Modem 54 and digitizer 58 comprise video receiving means. Digitizer 58 and MONITOR 64 comprise video reproduction means.

Figure 3:
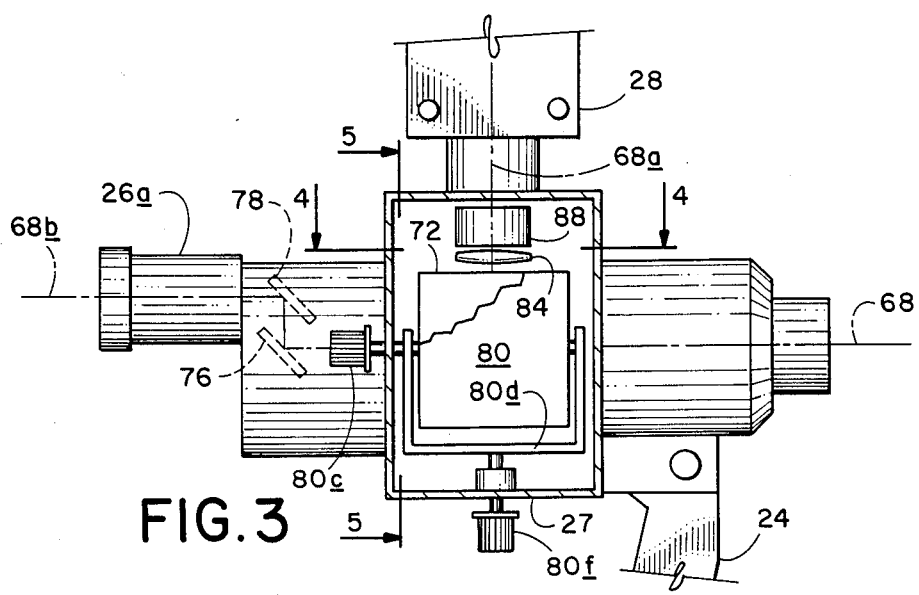
FIG. 3 is an enlarged side view of the slit lamp binocular, with portions broken away to show detail.
Figure 5:
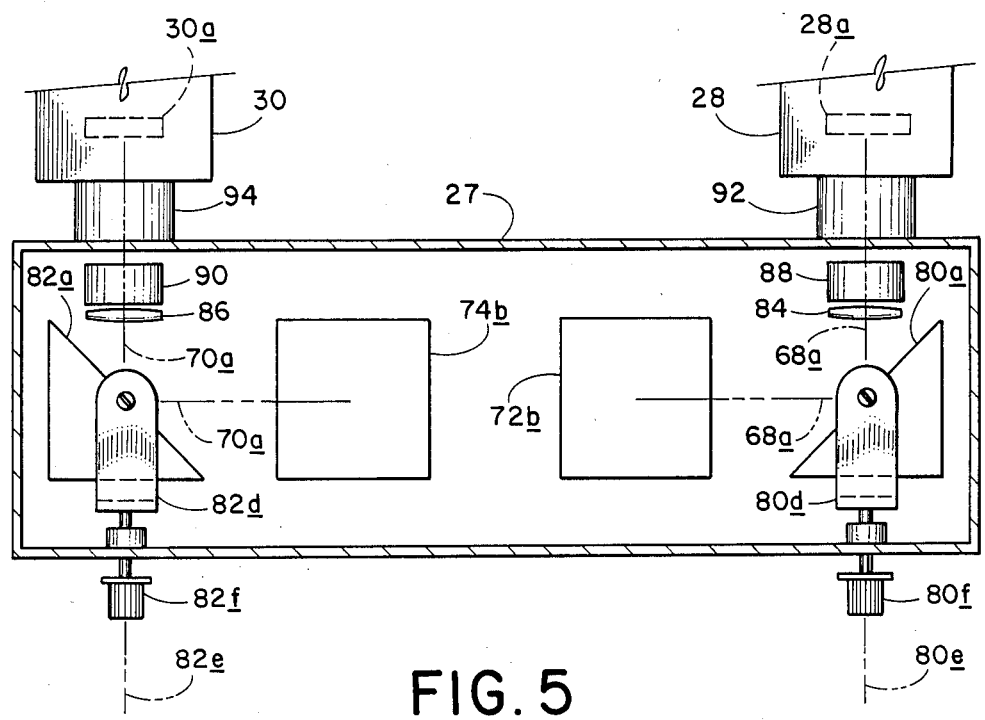
FIG. 5 is an enlarged front plan view of the interface, taken along line 5—5 of FIG. 3, with portions broken away to show detail.
Figure 4:
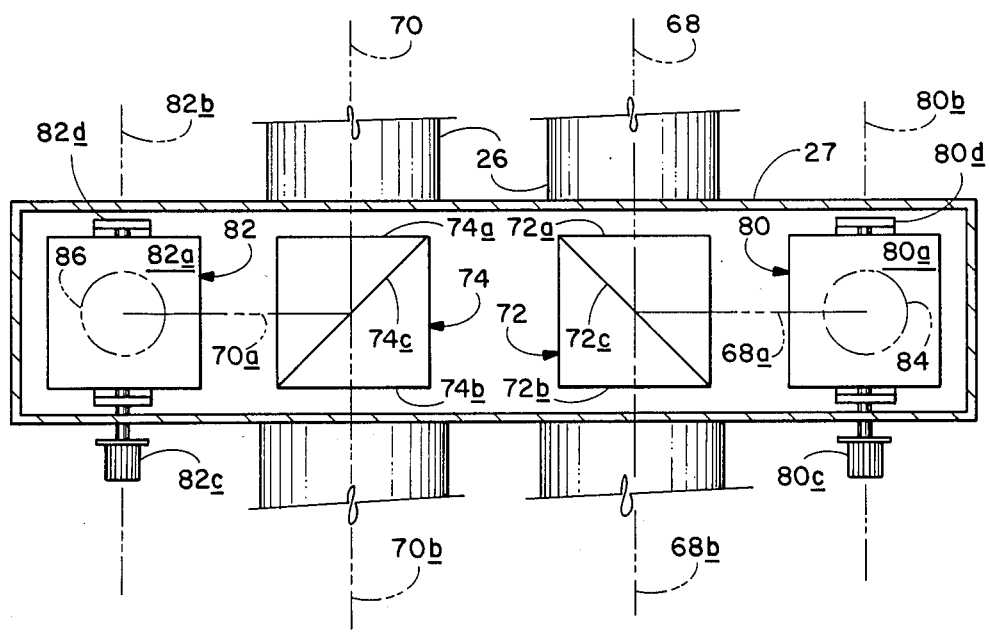
FIG. 4 is an enlarged top plan view of a binocular interface taken along the line 4—4 of FIG. 3, with portions broken away to show detail.

Turning now to FIGS. 3, 4 and 5, binocular interface 27 is shown in greater detail. An input image is represented by dash-dot line 68, and another input image is represented by dash-dot line 70. Images 68 and 70 both originate at patient 22's eye and represented slightly different images of the same eye. These images, when viewed through binocular eye pieces 26a, 26b, will, when the binocular is properly adjusted, form a directly, ocularly-viewed, three-dimensional, stereoscopic image to an observer looking into the eye pieces.

Interface 27, also referred to herein as a binocular camera mount, is interposed in conventional binocular 26 for the purpose of directing images 68 and 70 to cameras 28 and 30. Interface 27 is an elongate, box-like structure which encloses optical components which allow binocular 26 to function as a conventional slit lamp binocular and also provide means for mounting cameras 28 and 30 on binocular 26.

Contained within interface 27 is a pair of cubic, 50—50 beam splitters 72, 74. Beam splitters 72 and 74 divert each image into two image paths. One image path, such as image path 68a, is directed towards its respective video camera. The other image path 68b is directed towards the binocular eye pieces.

The beam splitters are comprised of two right angle prisms, such as 72a, 72b. The prisms are joined along their major sides, as shown at 72c, 74b, and the face of one major side is partially silvered to reflect substantially 50% of the light entering a minor face of prism 72a or 74a. Prisms 72b, 74b re-refract light which would bend upon leaving the major face of prism 72a or 74a, thereby realigning the input images, now at 50% of their original intensity, for continued passage through binocular 26. Referring to FIG. 3, image 68b impinges on mirrors 76 and 78 before leaving binocular 26 through eye piece 26a.

Image paths 68a, 70a are directed normal to input images 68, 70 to a biaxial steering mirror, 80, 82, respectively. The steering mirrors are also referred to herein as adjusting means. The biaxial mirrors provide means for adjusting the direction of projection of the image path of the input image to the video cameras.

As exemplified by steering mirror 80, each steering mirror includes a mirrored plate 80a which is mounted for rotation about a substantially horizontal axis 80b by means of adjusting knob 80c. Mirror 80a and knob 80c are pivotably mounted in bracket 80d which is in turn pivotably mounted on interface 27 for rotation about a substantially vertical axis 80e by knob 80f. A slot is provided in the rear wall of interface 27 to allow rotation of knob 80c therein. Knob 80f extends through a bore in the base of interface 27.

Image path 68a, on being directed by steering mirror 80, passes through an iris 84. Image path 70a passes through a corresponding iris 86. Irises 84 and 86 are also referred to herein as brightness control means and are placed between beam splitters 72, 74 and video cameras 28, 30, respectively. The irises adjust the brightness of the image path of the input image which reaches the video camera.

After passing through their respective irises, each image path passes through a lens 88, 90, also referred to herein as lens means, where it is properly focused prior to impinging a vidicon, shown schematically at 28a, 30a, in cameras 28, 30, respectively. In the particular embodiment being described, each lens is formed of two 45 millimeter Melles-Griot achromatic lens elements. The lens elements are fixed focus and are combined into a columnated lens having an effective focal length of 22.5 millimeters.

Cameras 28 and 30 are fixedly mounted on interface 27 by mounts 92, 94, respectively, which are standard C-thread-screw mounts.

Figure 6:
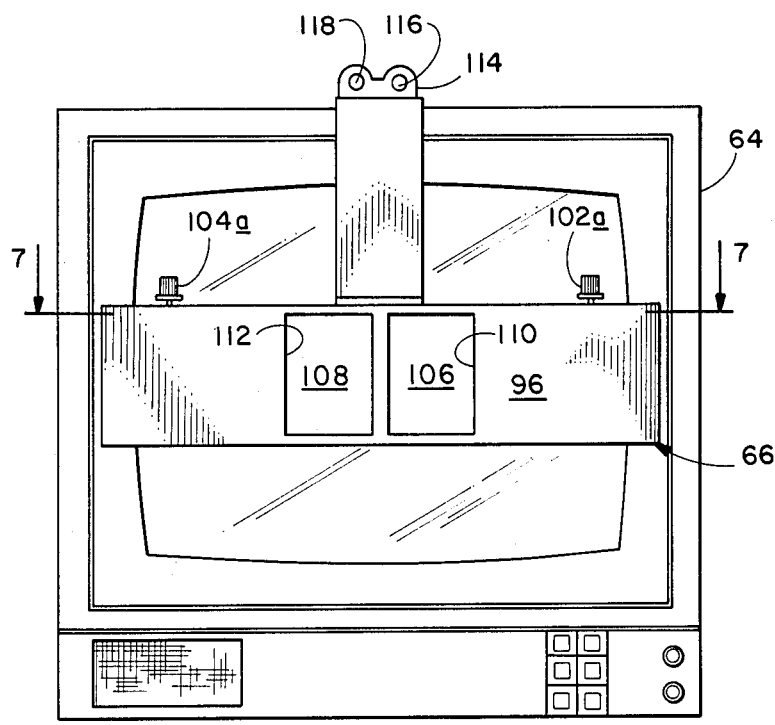
FIG. 6 is a front elevation of a video monitor and stereoscopic viewer of the system.

Turning now to FIG. 6, a stereoscopic viewer 66 is depicted mounted on a video monitor, such as monitor 64. Viewer 66 effectively "spreads" an observer's eyes to simulate convergence of the visual field on the monitor. An image displayed on monitor 64 may be stereoscopically viewed through the use of viewer 66. The image on monitor 64 will include representations of both input images and, when viewer 66 is properly adjusted, will give the effect to an observer of a three-dimensional, stereoscopic image.

Figure 7:
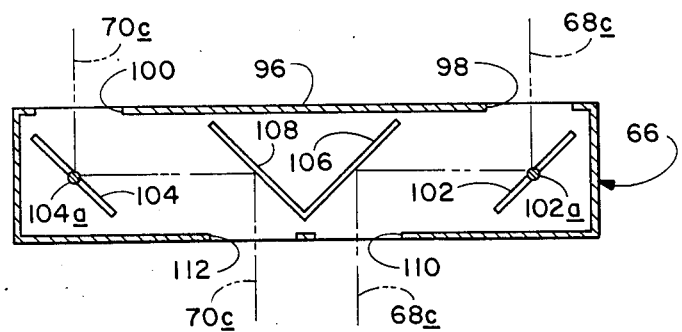
FIG. 7 is a top plan view of the stereoscopic viewer taken along the line 7—7 of FIG. 6, with portions broken away to show detail.

Referring now to FIGS. 6 and 7, viewer 66 includes an outer case 96 which has two forward ports 98, 100. A displayed image, represented by dash-dot lines 68c, 70c enters ports 98, 100 and impinges on mirrors 102, 104, respectively. The images are reflected to mirrors 106, 108, which are fixed in case 96 in a 90 degree relationship to one another. Images 68c, 70c are reflected by mirrors 106, 108 and exit viewer 66 through ports 110, 112. Mirrors 102 and 104 are adjustable by means of knobs 102a, 104a, also referred to herein as adjustable displayed-image alignment means, for adjustably directing the displayed images, 68c, 70c for stereoscopic viewing by an observer.

Viewer 66 is retained on monitor 64 by means of a bracket assembly 114 which is mounted to monitor 64 and which coacts with telescoping rods 116, 118 to allow positioning of viewer 66 relative monitor 64 thereby to optimize the stereoscopic image formed by viewer 66.

OPERATION

In use, the head of a patient, such as patient 22 in FIG. 2, is poised on slit lamp 14. Binocular 26 is adjusted to provide a focused three-dimensional stereoscopic image, comprising a pair of input images, to a visual observer of one of the patient's eyes. Cameras 28 and 30 sense the input images formed in binocular 26 and, with their respective control units 32, 34, generate video image signals representative of the input images as formed by binocular 26.

The signals are fed into generator 36 where the video image signals are converted into a single, combined video stereoscopic signal. When the video signal thus formed is displayed on monitor 38, it appears as two side-by-side images in what is referred to as a split screen. The images directed by the beam splitter to the steering mirrors are adjusted by means of steering mirrors 80, 82 to properly locate each image on the screen of monitor 38. Each image is enlarged by means of lenses 86, 88, so that the images fills 60% to 70% of the screen of monitor 38. Generator 36 is adjusted to discard the overlapped portions to optimally fill the monitor screen. The images thus formed are slightly different from one another in that they originated from two slightly spaced-apart locations.

When the operator is satisfied that the image on the monitor is suitable for analysis, still frame remote control unit 42 is activated and video digitizer 40 limits the video signal to a single still, freeze frame video stereoscopic signal which is transmitted by modem 48 over telephone line 50. Additionally, the signal so frozen could be stored in mass storage unit 46 and/or printed out by printer 44. The system allows an operator to simultaneously view the patient's eye and transmit a stereoscopic signal of the eye.

Alpha numeric data concerning the patient, patient history and other pertinent information, may be input via or generated by computer 52 and also transmitted over phone line 50 utilizing modem 48.

When the video signal arrives at the receiving portion of the apparatus, modem 54 converts the signal into an appropriate form where digitizer 58 further processes the signal and generates the split screen image previously displayed on monitor 38 on monitor 64. Again, the signal may be stored in mass storage unit 62 or printed out in hard copy form on printer 60. Unit 62 has the capacity to store retrievably multiple signals sufficient to regenerate in excess of 100 stereoscopic images. Any transmitted alpha numeric data may be viewed on a monitor included in computer 56.

A physician diagnosing the patient then utilizes a stereoscopic viewer 66 positioned for viewing the split-screen image on monitor 64 to view a three-dimensional image of patient 22's eye.

While a preferred embodiment of the apparatus and method of practicing the invention have been disclosed, it is to be appreciated that variations and modifications may be made in the apparatus and method without departing from the spirit of the invention.

It is claimed and desired to secure by Letters Patent:

1. A binocular camera mount for aligning two video cameras to produce a pair of image signals of an object for stereoscopic viewing by a remote observer comprising:
    visual observing means for directly, ocularly stereoscopically viewing two input images of the object,
    beam splitting means for diverting each input image into two image paths, one of which is directed to a video camera and the other of which is directed to said visual observing means,
    adjusting means for adjusting the direction of projection of said one image path, and
    video-stereoscopic-image-producing system means for compiling the image signals into a combined video stereoscopic signal, transmitting the combined signal to a remote location, and generating a stereoscopic video display representative of the object for stereoscopic viewing by such an observer.

2. The camera mount of claim 1, which further includes brightness control means interposed said adjusting means and the video cameras.

* * * * *